May 10, 1927.

Re. 16,620

A. W. LIMONT

METHOD OF MAKING VALVE STEMS

Original Filed Nov. 12, 1921

Inventor

Alexander W. Limont

By Henry E. Rockwell

Attorney

Reissued May 10, 1927. Re. 16,620

UNITED STATES PATENT OFFICE.

ALEXANDER W. LIMONT, OF BRIDGEPORT, CONNECTICUT.

METHOD OF MAKING VALVE STEMS.

Original No. 1,446,470, dated February 27, 1923, Serial No. 514,589, filed November 12, 1921. Application for reissue filed August 25, 1924. Serial No. 734,132.

This invention relates to an improved method of manufacturing pneumatic tire valve stems, bodies or casings, and more especially relates to a method of producing such stems, bodies or casings from drawn sheet metal shells or tubes.

The object of the invention is to provide a novel method designed to lessen the cost of manufacturing valve stems, bodies or casings from metal shells or tubing by reducing the amount of stock required from which to form a valve stem, and, particularly to produce a lighter and stronger valve stem at less cost.

Valves for pneumatic tires usually comprise a long casing member which is provided with a bore from end to end. The outside diameter of this casing is limited to certain established shapes and sizes, and under the present accepted design and methods of manufacture, the internal bore must be of small dimension, particularly as relates to the necked portion between the enlarged outer head and the body portion of the casing, and to the inner reduced body portion of the casing, which is machined to receive a standard valve seat and plunger, customarily made separate and inserted in the bore by screwing in. The most expensive part of a valve is the stem or casing as now constructed from a solid blank, the bore being produced by drilling the blank from end to end, the flats being milled upon the opposite sides of the blank, and the neck portion and the corrugations customarily located under the head beng cut in. In addition, a larger amount of metal than is necessary for the strength and proper functioning of a valve stem is required to be used when the stem is made from solid stock.

In the construction of valve stems, bodies or casings from metal shells or tubing by practicing the present method, I employ a series of operations which may be uniformly and accurately performed by automatic machinery whereby the essential features of standard makes and sizes of valve stems may be produced, and whereby the required structural features of valve stems of the present character, made necessary to permit of the interchangeability of the valve stems and their parts, are provided for. This invention comprises a method of forming valve stems, bodies or casings from shells or tubing constituted by an elongated cylindrical side wall open at one or both ends, whereby not only the required form of opening through the valve stem can be produced, but a head having the usual corrugated face, can be produced as well, and the body of the stem can be provided with flat side portions and with a necked portion of a thickness greater than that of the walls of the body to reinforce the stem adjacent to the head where the greater strains occur, said reinforcement being provided by means other than cutting and milling.

With the above and other objects in view, the invention resides and consists in the novel method of forming an article of manufacture of the above character as will be now fully described and hereinafter specifically claimed.

Upon the accompanying drawing forming a part of this specification, similar characters of reference will be seen to denote like or corresponding parts throughout the several figures and of which, Fig. 1 shows a side elevation of a shell or tube of uniform thickness of wall, such as may be readily drawn from metal;

It is to be understood that the disclosure herein is merely illustrative, designed to represent the preferred method of operations I now contemplate employing in the production of a valve stem, body or casing, it being obvious that slight variations may be resorted to if necessary without departure from the spirit of the invention and the scope of the claims, the essential features of the invention being the production of a commercial type of valve stem from drawn shells or tubing by a series of operations which include the reduction of certain portions of the cylindrical body of the shell or tubing whereby the same is shaped and adapted to be threaded, and in the further features of forming the head of the open portions of the shell or tubing, said head being of a double thickness of stock and of a diameter greater than that of the body and having therein an opening insuring an air passage without the necessity for specially drilling said opening, and said head being further adapted to receive upon its under face the usual corrugations found in valve stems of the present type.

Figure 1:
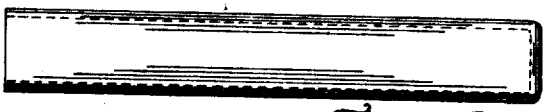
Figure 3:
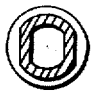
Fig. 3 is a sectional view on line 3—3 in Fig. 2, looking in the direction of the arrows.
Figure 2:
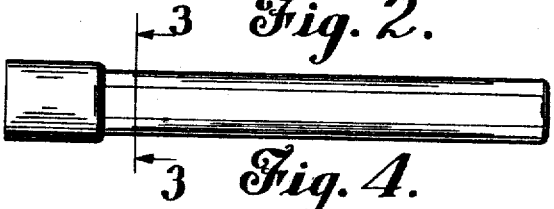
Fig. 2 illustrates the same shell reduced to a predetermined diameter and length and with flats formed on opposite sides thereof, the remaining portion of the shell being of the original size.

In the drawing, 10 may represent a cylindrical tube or a shell having a bottom 11, the wall of said tube or shell being of uniform thickness throughout, and said tube or shell being open at one end 12. This shell constitutes the blank from which the valve stem is formed and according to the present invention is first operated upon in a way to reduce the shell to a predetermined diameter and length, denoted at 13, and having flats 14 formed on opposite sides thereof, the remaining portion 15 of the shell, adjacent the end 12 thereof, being of the original size. See Figs. 2 and 3. This reduction of the portion 13 of the shell forms the annular shoulder 16 upon that part of the portion 15 adjacent the portion 13.

Figure 4:
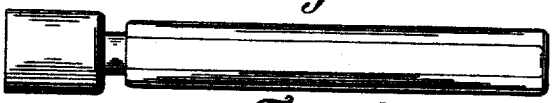
Fig. 4 shows the shell necked or reduced preparatory to the heading operation.

While it is not necessarily material as to the exact order of all the operations, I prefer to neck or reduce the shell as the next operation, to provide the reinforced neck portion 17 of the stem or casing, the necking operation not only reduces the outer diameter to the required size but also thickens the wall of the shell at the location of the neck where added stock is most advantageous to strengthen the stem adjacent to the head where the greater strains occur. See Fig. 4.

Figure 5:
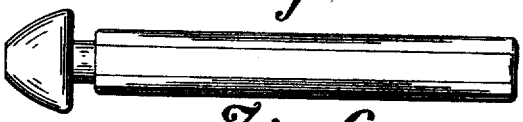
Figs. 5 and 6 illustrate the heading operation.
Figure 6:
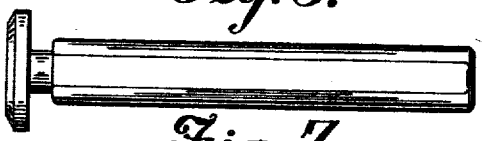

The shell may next be placed in suitable dies and the portion 15 thereof operated upon to produce the flat head 18 as shown in Fig. 6 in a way to retain the diameter and complete the shape of the neck portion 17, without the necessity of closing the opening through the portion 15, thereby eliminating the requirement for drilling, the operation upon the portion 15 being accomplished in what may be termed two steps suggested in Figs. 5 and 6. That is to say, the portion 15 is first shaped to general conical configuration as at 19 in Fig. 5, and afterwards shaped to its final form as in Figs. 6 and 7. The usual corrugations, as at 20 in Fig. 7, may then be pressed into the under face of the head.

Figure 7:
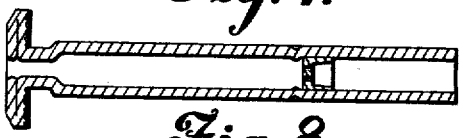
Fig. 7 is a longitudinal sectional view showing the tube or shell with end cut off and trimmed to length, the internal stop being also disclosed.
Figure 8:
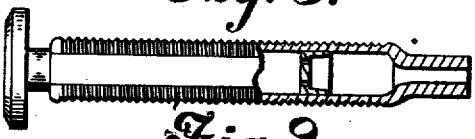
Fig. 8 is a sectional side elevation of the shell showing a portion of the end of the shell reduced to a standard dimension.
Figure 9:
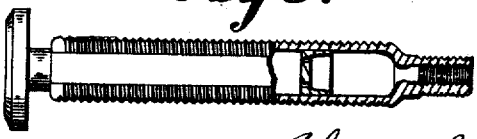
Fig. 9 is a sectional side elevation showing the same portion of the shell externally threaded to the standard size and internally threaded and reamed to receive any standard valve.

In the case of a shell, as shown, the end 11 thereof may then be removed, and if the valve stem is to be fitted with the common commercial type of valve, I may employ an internal support 21, as in Figs. 7, 8, and 9, having holes therethrough, and position it inside the shell prior to the operation of shaping the free end of the portion 13 so that it will furnish a proper support for the shoe of the valve. The support 21 may be held in position in any preferred way as for instance by being forced into the shell against protuberances 22 prior to the operation of shaping the free end of the portion 13.

Said free end of portion 13 may be then reduced as shown in Fig. 8 at 23, the portion 23 is then reamed out to provide the annular shoulder 24 in Fig. 9 to furnish a valve seat and tapped as at 25 for an obvious purpose, and a thread 26 is externally placed upon the portion 23 to retain a closure cap in usual manner. The thread 27 upon the cylindrical peripheral surface of the body of the stem may be next formed to complete the formation of the valve stem, said thread, as is customary in valve stems of this sort, being employed to accommodate nuts, not shown, that engage the tire tube and a wheel rim and clamp the valve stem in position therein.

The cross sectional view in Fig. 7 illustrates that the head of the valve stem is provided with an opening 28 resulting from the particular method of producing the head making drilling of the head unnecessary.

What I claim is:

1. The herein described method of forming valve stems from a hollow drawn metal body, which consists in reducing the diameter of a portion of the body, in further reducing a portion of said body to provide the neck of the stem, in then shaping the non-reduced portion of said body to provide the head of the stem, and further reducing the opposite end of said body and threading the inside and outside of said last mentioned reduced portion.

2. The herein described method of forming a valve stem from a hollow drawn metal body which consists in reducing the diameter of a portion of the body, in further reducing a portion of said body to provide the neck of the stem, in then shaping the non-reduced portion of said body to provide the head of the stem, in further reducing the opposite end of said body to partially close the same and in reaming out said last mentioned reduced end and internally and externally threading the same.

3. The herein described method of forming valve stems from sheet metal shells which consists in reducing the closed end portion of the shell to provide a body of predetermined length, in further reducing a portion of said body to provide the neck of the stem, in then shaping the open end of the shell to provide a head, and in finally removing the closed end of the body and shaping the same to provide for the reception therein of a valve.

4. The herein described method of forming a valve stem from a hollow drawn metal body which consists in reducing a portion of said shell to provide a body of predetermined length, in further reducing a portion of said body to provide the neck of the valve stem, in then shaping the portion of said body adjacent said neck to simultaneously provide a head and a central air passage therethrough, and in finally forming the end of said body spaced from said head to equip the same to receive a valve.

5. The herein described method of forming a valve stem from a hollow drawn metal body, which consists in reducing a portion of said body, in further reducing one end of said reduced portion of said body to provide the neck of the valve stem, in then shaping the non-reduced portion of said body adjacent said neck to provide a head having therethrough an opening, and in finally forming corrugations upon said head and shaping the end of said body spaced from said head to equip the same to receive a valve.

6. The method as set forth in claim 4, including the drawing of flats upon said body.

7. The herein described method of forming a valve stem from a hollow drawn metal body, which consists in drawing the major portion of said body to provide a flat-sided body, in further reducing a portion of said body to provide the neck of the valve stem, in then shaping the minor non-reduced portion of said body adjacent said neck to provide a head, and in finally working upon the end of said body spaced from said head to equip the same to receive a valve.

8. The herein described method of forming valve stems from a hollow drawn metal body, which consists in reducing the diameter of a portion of the body of a determined thickness and length, in further reducing a portion of said body to provide a neck of the stem, the wall of said neck being thicker than that of the body, then shaping a non-reduced portion of said body adjacent said neck to form a head and reducing the opposite end of said body and threading the inside and outside of said last mentioned reduced portion.

9. The method of forming valve stems from a hollow drawn metal body of uniform diameter, which consists in reducing a portion of the body, and in shaping the non-reduced portion to form the head of the stem.

10. The method of forming valve stems from a hollow drawn metal body of uniform diameter and closed at one end, which consists in shaping the open end portion of the body to provide the head of the stem, while maintaining an opening therethrough.

11. The method of forming a valve stem from a hollow drawn metal body closed at one end, which comprises shaping the open end of the body to form a head while maintaining an opening therethrough, cutting off and reducing the diameter of the closed end and threading the last named end internally and externally.

12. The method of forming valve stems from a hollow drawn metal body closed at one end, which comprises reducing the size of and elongating a portion of the body, forming a head upon the unreduced portion, drawing flat sides upon a portion of the body and cutting off the closed end to provide an opening through the same.

13. The method of forming valve stems or the like, which comprises drawing from a suitable blank a hollow shell provided with a reduced end and flat sides upon a portion thereof, forming a head upon the unreduced portion of the body, and providing external threads upon the body of the headed stem.

14. The method of forming valve stems from a hollow drawn metal body open at one end and closed at the other, which consists in reducing in cross-section and elongating a substantial portion of the length of the body remote from the open end while leaving the open end of approximately the original thickness and shape, squeezing the metal in the open end lengthwise and inwardly to create a relatively thick round head.

15. The method of forming valve stems from a hollow drawn metal body open at one end and closed at the other, which consists in reducing in cross-section and elongating a substantial portion of the length of the body remote from the open end and extending up to the closed end, thus leaving the open end of substantially the original thickness, squeezing the metal in the open end lengthwise and inwardly to create a relatively thick head, and drawing flat sides on the reduced portion of the body.

16. The method of making a tire valve stem, which comprises drawing from a suitable blank a sheet metal shell having an enlarged open end and a smaller body portion, and then forming a head upon said enlarged end.

17. The method of making a tire valve stem, which comprises drawing from a suitable blank a sheet metal shell having an enlarged open end and a smaller body portion, forming a head upon said enlarged end, cutting off the closed end to provide a passage through the shell, and reducing said last named end to form an upper neck.

18. The method of making a tire valve stem, which comprises drawing from a suitable blank a sheet metal shell having an enlarged open end and a smaller body portion, forming a head upon said enlarged end, cutting off the closed end to provide a passage through the shell and reducing said last named end to form an upper neck, and then threading said neck externally and internally.

19. The method of making a tire valve stem, which comprises drawing from a suitable blank a sheet metal shell having an enlarged open end portion and a smaller body portion, forming a head upon said enlarged end, trimming the closed end of the blank to provide an opening therethrough, inserting in said last named end a cup-shaped support having a side wall snugly fitting the inner wall of the valve stem, and then closing in the mouth of said stem to retain the support and provide an upper neck.

20. The method of forming valve stems from a hollow drawn metal body open at one end and closed at the other, which consists in reducing in cross-section and elongating a substantial portion of the length of the body remote from the open end thus leaving the open end of the original diameter, forcing the metal in the open end lengthwise and inwardly to create a relatively thick head, and drawing flat sides on the reduced portion of the body, and cutting off and exteriorly and interiorly threading the closed end of the blank.

In witness whereof, I have hereunto set my hand this 21st day of August, 1924.

ALEXANDER W. LIMONT.

Certificate of Correction.

Reissue Patent No. 16,620. Granted May 10, 1927, to

ALEXANDER W. LIMONT.

It is hereby certified that error appears in the above-numbered patent requiring correction as follows: In the drawing, the figures should appear with the reference characters as shown below:

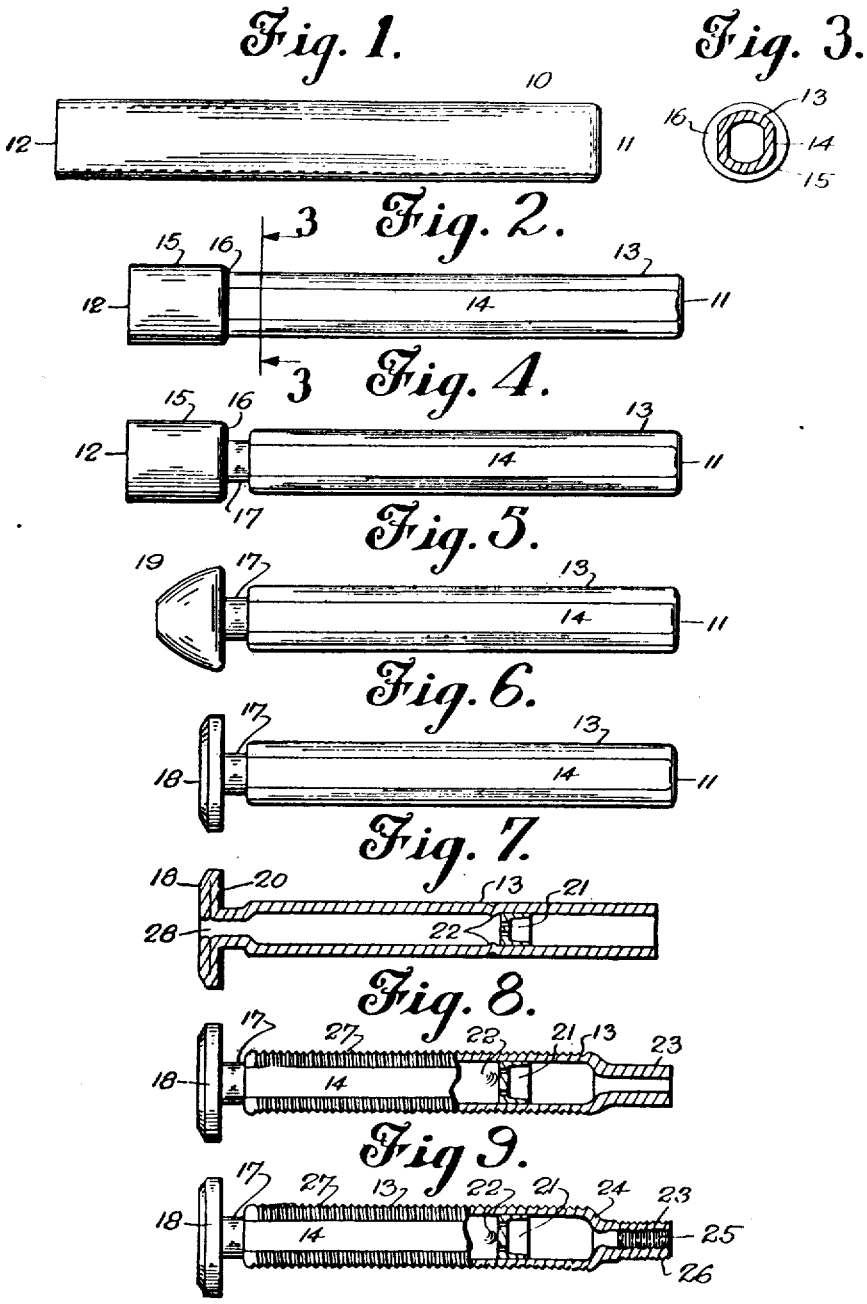

and that the said Letters Patent should be read with this correction therein that the same may conform to the record of the case in the Patent Office.

Signed and sealed this 14th day of June, A. D. 1927.

[SEAL.]

M. J. MOORE,
*Acting Commissioner of Patents.*